United States Patent [19]

Rea

[11] 4,162,065
[45] Jul. 24, 1979

[54] WORK HOLDING FIXTURE FOR CYLINDRICAL WORKPIECES

[76] Inventor: Andrew Rea, 10271 Nottingham, Detroit, Mich. 48224

[21] Appl. No.: 917,336

[22] Filed: Jun. 20, 1978

[51] Int. Cl.² ................................................. B23Q 3/00
[52] U.S. Cl. ..................................... 269/294; 269/307; 269/321 N
[58] Field of Search ................... 408/16, 103; 90/11 E; 33/185 R; 269/321 N, 315, 294, 307

[56] References Cited

U.S. PATENT DOCUMENTS

| 893,875 | 7/1908 | Schneider | 269/321 N |
| 3,985,462 | 10/1976 | Didato | 33/185 R |
| 4,005,945 | 2/1977 | Gutman | 269/321 N |

*Primary Examiner*—Robert C. Watson
*Attorney, Agent, or Firm*—William L. Fisher

[57] ABSTRACT

A work holding fixture for cylindrical workpieces comprising a first member having a flat base and a cylindrical portion upstanding from the base, a horizontal V-groove formed in the upper end of the cylindrical portion, and a pair of clamps having fasteners for fastening to the cylindrical portion, the clamps having cross-bars which span the V-groove for clamping cylindrical workpieces therein, vertical flats formed on opposite sides of the first member including the base and cylindrical portion thereof, the V-groove extending between the flats, the first member capable of being held via any of the three flats thereon for grinding cylindrical workpieces held in the V-groove of the first member, the first member also capable of being bolted via its base for milling cylindrical workpieces held in the V-groove of the first member, and a second member having a hollow cylindrical body which fits over and slides on the cylindrical portion of the first member, and aligned central apertures in the first and second members for carrying out a drilling operation on cylindrical workpieces held in the V-groove of the first member.

6 Claims, 6 Drawing Figures

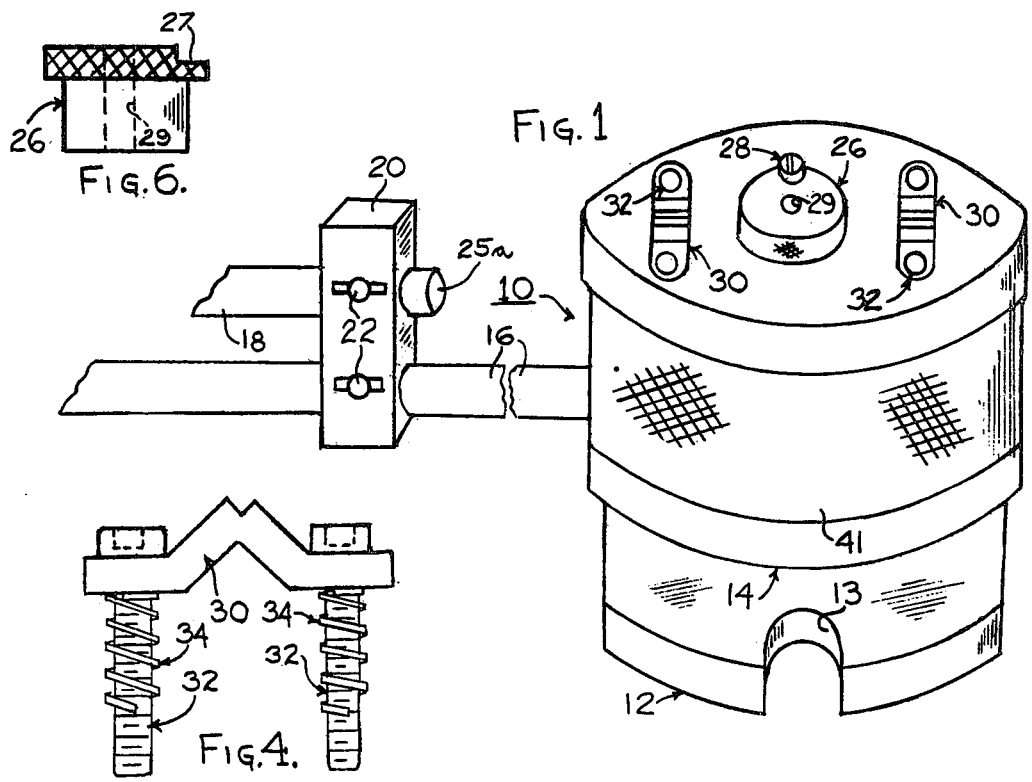
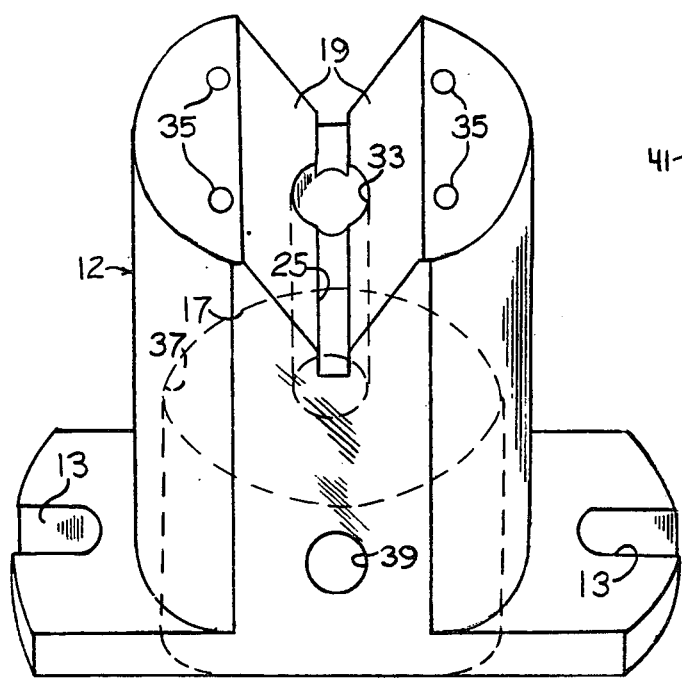
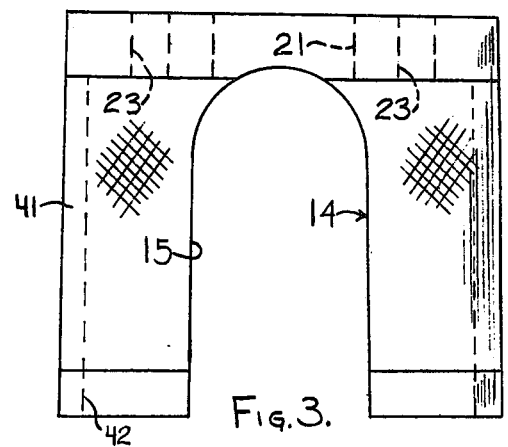
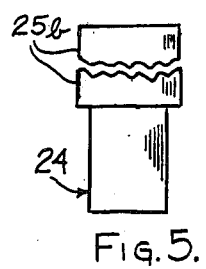

WORK HOLDING FIXTURE FOR CYLINDRICAL WORKPIECES

My invention relates to work holding fixtures.

The principal object of my invention is to provide improved work holding fixtures for cylindrical work pieces which are simple in construction but extremely versatile in use.

Said work holding fixtures promote efficient metal working operations and can be used in drilling, grinding, and milling and greatly decrease set-up time to drill precise holes in cylindrical stock.

The foregoing object of my invention and the advantages thereof will become apparent during the course of the following description, taken in conjunction with the accompanying drawings, in which:

FIG. 1 is a perspective view of an improved work holding fixture embodying my invention;

FIG. 2 is a perspective view of a part of the structure of FIG. 1;

FIG. 3 is a front elevational view of another part of the structure of FIG. 1;

FIG. 4 is a front elevational view of another part of said work holding fixtures; and FIGS. 5 and 6 are respective elevational views of other parts of said work holding fixture.

Referring to the drawings in greater detail, and first to FIGS. 2 and 4, 12 generally designates the work holding member shown in FIG. 2 which comprises a base having slots 13 formed therein and a cylindrical portion upstanding from said base. Said cylindrical portion has precisely machined vertical flats 17 formed on opposite sides thereof and a precisely machined flat horizontal top surface having pairs of threaded apertures 35 formed inwardly thereof. A central precisely machined V-groove 19 is formed inwardly of said flat top and extends between said vertical flats 17. Said flats 17 and the V-groove 19 are precision ground perpendicular to each other to insure accuracy in locating metal working stock. A slot 25 is formed at the base of the V-groove 19. A vertical central precisely machined aperture 33 is formed in said fixture 12. Also a horizontal threaded aperture 39 is provided for said member 12 which extends therethrough between said flats 17. Said work holding member 12 has a cylindrical cut-away portion 37 in the underside thereof which intersects with said aperture 33 as shown to lighten said fixture 12 and to serve as a chip clearance during drilling operations.

FIG. 4 shows one of a pair of clamps consisting of a cross-bar 30 and a pair of cap screws 32 which threadably engage in the threaded apertures 35 and a pair of compression springs 34 carried on said screws 32. Said cross-bar 30 has large and small V-grooves formed therein on opposite sides thereof as shown. Said pair of clamps are used to clamp cylindrical stock in the V-groove 19 and in the case of small diameter cylindrical stock the cross-bars 30 are inverted so that the small V-grooves therein engage such stock. In use of the fixture 12 for grinding it can be used like other V-blocks employed at present in tool rooms. For milling the member 12 can be bolted, as at 13, to a mill table for heavy machining operations or can be laid on its side on one of the flats 17 and held magnetically.

Referring now to FIGS. 1, 3 and 5, 6, the work holding fixture shown in FIG. 1 is generally designated 10 and comprises said work holding member 12 previously described and a member 14 which is slidable on the cylindrical portion of said member 12 for drilling cylindrical stock. Said member 14 has a top wall having a central through-aperture 21 and clearance apertures 23 and a central bottom-opening blind cylindrical bore 42 formed therein. Said bore 42 extends from said top wall to the bottom thereof for slidably engaging and being held on the cylindrical portion of said member 12. Said member 14 also has a pair of arcuately shaped through-cavities 15 diametrically formed in the cylindrical wall thereof for clearance in respect to cylindrical stock disposed in said V-groove 19. The outside surface of said member 14 is knurled, as at 41, to assist in handling the same. When properly positioned on the member 12, said member 14 has its clearance apertures 23 aligned with the pairs of threaded apertures 35 and the axis of said cavities 15 is aligned with said V-groove 19. With cylindrical stock clamped in the fixture 10, a drill bushing 26 is inserted in the aperture 21 and held in place via the screw 28 which is threadably engaged in the top wall of the member 14. In this way the aperture to be drilled in the cylindrical stock is precisely through a diameter thereof. Different drill bushings having different predetermined drill guide apertures 29 formed therein are employed depending upon the diameter of the aperture desired to be drilled in the work piece.

When the drilled hole must be at a precise distance from the end of the stock, a locator member 24 with a precisely machined enlargement 25b is inserted in the aperture 33. A rod 16 carrying an adjustable block 20 and an adjustable rod 18 is threadably fastened in the threaded aperture 39 to thereby locate the end surface 25a of the rod 18 in respect to the center of the aperture 33. The distance between the outside surface of said enlargement 25b and the end surface 25a is measured using standard size measuring blocks and said surface 25a moved accordingly, via wing nuts 22, so that it is precisely located in respect to the center of the aperture 33; the radius of said enlargement 25b is, of course, added to that of the measuring block. One end of the cylindrical stock to be drilled is made to abut against the end surface 25a, whereby it will be precisely located lengthwise in respect to the exact center of said aperture 33. In this way when the stock is drilled using the drill bushing 26, as described, the aperture to be drilled will be at the desired precise distance from the end as well as precisely through a diameter thereof.

It will thus be seen that there has been provided by my invention an improved work holding fixture in which the object hereinabove set forth, together with many thoroughly practical advantages, has been successfully achieved. While preferred embodiments of my invention have been shown and described, it is to be understood that variations and changes may be resorted to without departing from the spirit of my invention as defined by the appended claims.

What I claim is:

1. A work holding fixture for cylindrical workpieces comprising a first member having a flat base and a cylindrical portion upstanding from said base, a horizontal V-groove formed in the upper end of said cylindrical portion, and a pair of clamps having fastening means for fastening to said cylindrical position, said clamps having cross-bars which span said V-groove for clamping cylindrical workpieces therein, vertical flats formed on opposite sides of said first member including the base and cylindrical portion thereof, said V-groove extending between said flats, said first member capable of being held via any of the three flats thereon for grinding cylindrical workpieces held in said V-groove, said first member also capable of being bolted via its base for milling cylindrical workpieces held in said V-groove, and a second member having a hollow cylindrical body which fits over and slides on the cylindrical portion of said first member, and aligned central apertures in said first and second members for carrying out a drilling operation on cylindrical workpieces held in said V-groove.

2. A work holding fixture as claimed in claim 1, said cylindrical portion having a threaded aperture therein axially aligned with and disposed beneath said V-groove, and a locator arrangement including a rod capable of being threadably engaged in said threaded aperture, a block axially slidable on said rod and carrying a locating surface for lengthwise locating cylindrical workpieces held in said V-groove.

3. A work holding fixture as claimed in claim 2, said locator arrangement including a cylindrical plug insertable in said central aperture of said first member, said cylindrical plug having a cylindrical enlargement thereon which is used as a second locating surface for drilling cylindrical workpieces at precise lengths from the ends thereof.

4. A work holding fixture as claimed in claim 1, means associated with said cylindrical portion for lengthwise locating the cylindrical workpieces in said V-groove for carrying out a machining operation thereon at a precise distance from one end thereof.

5. An improved method of holding and positioning a cylindrical workpiece for carrying out a drilling operation thereon comprising providing a first member having a base and a cylindrical portion upstanding from said base having a V-groove in the upper end thereof, providing a second hollow cylindrical member which fits over and slides on said cylindrical portion of said first member, disposing and clamping said workpiece in said V-groove and providng aligned central apertures in said first and second members for carrying out said drilling operation.

6. Improved method as claimed in claim 5 further comprising providing a vertical central aperture in said first member, providing a vertical reference surface which is positionable lengthwise of said cylindrical portion and, while said cylindrical workpiece is disposed in said V-groove, abutting an end of said cylindrical workpiece against said reference surface, whereby to drill said cylindrical workpiece at a precise length from the end thereof.

* * * * *